July 4, 1967  R. A. HEATON ETAL  3,329,396
DISPENSING RATE CONTROL MECHANISM

Filed Dec. 10, 1963  2 Sheets-Sheet 1

INVENTORS.
RICHARD A. HEATON
RICHARD G. DAVEY

BY W. A. Schaich and Philip M. Rice

ATTORNEYS.

July 4, 1967  R. A. HEATON ETAL  3,329,396
DISPENSING RATE CONTROL MECHANISM
Filed Dec. 10, 1963  2 Sheets-Sheet 2

INVENTORS.
RICHARD A. HEATON
RICHARD G. DAVEY
BY W. A. Schaich and Philip M. Rice
ATTORNEYS.

United States Patent Office 3,329,396
Patented July 4, 1967

3,329,396
DISPENSING RATE CONTROL MECHANISM
Richard A. Heaton and Richard G. Davey, Toledo, Ohio, assignors to Owens-Illinois Inc., a corporation of Ohio
Filed Dec. 10, 1963, Ser. No. 329,432
7 Claims. (Cl. 251—212)

This invention relates to control of feed rate of material issuing from an orifice and more particularly to an adjustable diaphragm for control of glass in a gob feeder at the forehearth of a furnace.

In drawing glass special precautions must be taken in selecting the material coming in contact with the glass to avoid glass contamination. In gravity feeding from the forehearth it is also important that the glass be withdrawn at the desired rate and that the stream be kept intact and simple in shape to avoid the formation of cool spots. Ordinary valves and control mechanisms are not suitable for this service, partly because of glass contamination caused when structural materials are long in contact with molten glass, and partly because the materials themselves are destroyed or changed due to the presence of certain chemically active fumes at the temperatures employed in the glass drawing operation. One suitably stable material is ceramic, but it has not ordinarily been possible to form valves and moving parts of fragile materials such as ceramic. It has been commercial practice to control the drawing orifice for a forehearth with a cast bushing defining the dimensions of the stream of molten glass from the forehearth, and to change the size of the bushing in accordance with requirements to provide different rates of flow. Changing bushings interrupts production in an otherwise continuous process and does not satisfy the needs as known in the art of glass making where variability of rate is required.

In addition to the need for a valve to control flow of liquid glass numerous other factors make it desirable to close the lower end of a delivery chute or opening by means of an iris-type valve which may be adjusted in size automatically by means of a motor or manually by turning a crank or knob. Various examples of mixture preparation include molding ingredients, grain, and concrete, particularly where several streams are drawn simultaneously and it is desirable to change the rate of flow in one stream with respect to others.

Prior iris diaphragms have not been useful because the vanes are not coplanar and overlap as the iris is adjusted. A tight fit is impossible, with the result of leakage above and between vanes and the spout so that clogging inevitably results. Accordingly, it is an object of this invention the provide a gravity feed control means in the form of an iris closure mechanism adapted for sliding planar engagement with the lower end of a delivery spout.

Another object of the invention is to provide an adjustable valve mechanism comprising a number of cooperating leaf elements disposed in a common plane slidingly engaging the open end of a delivery tube thereby to vary the opening.

A further object of the invention is to provide a mechanism comprising a plurality of leaf elements in a common plane having slidingly engaged edges forming a tight closure therebetween and a tight closure between an upper iris surface and a delivery spout against which the mechanism is urged to throttle the spout opening.

Still another object of the invention is to provide a stream-controlling iris member adaptable for the control of liquid and granular materials, which may be adjusted as to rate of flow by sliding each element with respect to the others, each arranged to fit snugly with two adjacent members for any desired opening of the valve.

A still further object of the invention is to provide a material-controlling sliding-vane valve for viscous materials which is self-cleaning and non-dogging.

Other objects and features of the invention will be better understood as the invention is described in connection with the following figures in which.

The objects of this invention may be achieved in one embodiment by providing a ring gear actuatable by a pinion gear, or by a plurality of pinion gears, through a desired arc of rotation, the ring being fitted with like cam surfaces to actuate the vanes toward or away from the center at a selected angle such that the cooperating edges of the vanes slide with respect to each other while effecting an increase or a decrease in the size of the opening between the vane members. Each of the vane members is slidably attached to a common backing plate for sliding motion thereon and has its opposite face in a plane common to all vane members. Each vane member is slotted for linear movement along perpendicular lines as urged by a cam follower in which the linear movement is at an angle to the radial direction. Each vane member has an offset termination having a terminal straight edge at 45° to the angle of motion of the vane member and has a second edge 90° from the first edge whereby four such elements can be arranged each to slide linearly with respect to the two adjacent vane members. As the four elements of this configuration are urged toward the center a square orifice therebetween is decreased in size, and is increased in size as the elements are moved outwardly. An orifice of the delivery chute or tube overlies the iris diaphragm and has a diameter equal to or greater than the maximum opening between the vanes when they are in their outermost position but less than double this diameter. Each vane member is controlled in like sliding engagement with the base plate through like linear adjustments at all times by the provision of similar cam surfaces attached to, and forming part of, a ring member concentrically arranged with respect to the center point of the orifice. Rotation of the ring, preferably by gears, similarly actuates the vanes.

Figure 2:
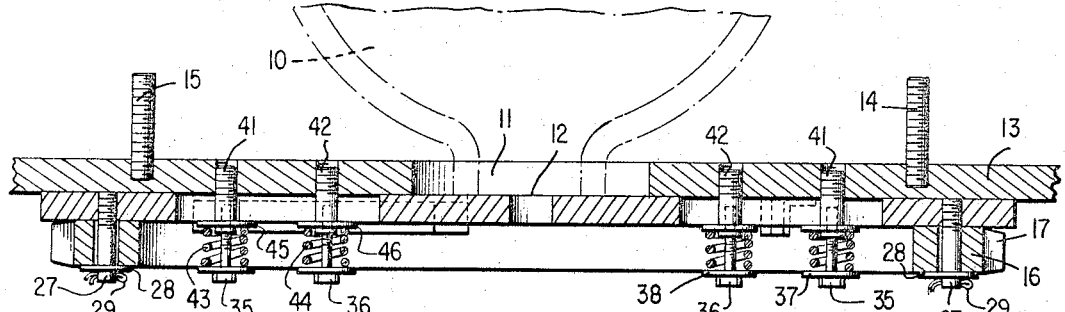
FIG. 2 illustrates attachment of the mechanism of FIG. 1 to the lower open end of a delivery chute, as in a glass furnace or hopper, and consists in part of a sectional view taken along the line 2—2 of FIG. 1.
Figure 3:
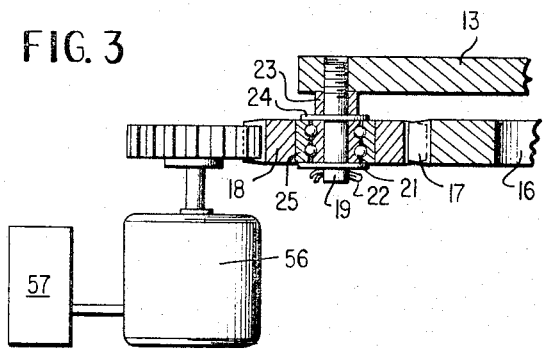
FIG. 3 is a sectional view of a portion of the apparatus of FIG. 1 taken along the line 3—3.

Referring now to FIG. 2, which represents a glass furnace forehearth, reservoir 10 has an opening or spout 11 arranged with its axis vertical for drawing fluent material from the reservoir. This spout or orifice has a termination lying generally within a plane extending along the line 12 so that spout 11 may be closed by a planar diaphragm according to this invention arranged adjacent thereto. A support or base plate 13 surrounds or underlies spout 11 and has a plane surface including line 12 when the diaphragm is therebelow and is supported from the reservoir 10 or associated structure by studs 14 and 15, attached thereto in any desired manner, not specifically shown.

Base plate 13 is illustrated as the upper member of the assembly of FIG. 2, but could be inverted by placing the iris assembly thereabove and by supporting the base plate 13 from below or from studs exterior to adjusting ring 16. Teeth cut in the outer periphery of ring 16 form a ring gear 17 thereon concentric with the spout 11. Ring gear 17 engages, preferably, three pinion gears 18 of which one may be motor driven or operated by a remote control linkage, motor, or hand crank. Gears 18 are mounted on base plate 13 by studs or bolts 19 spaced equidistantly on a bolt circle concentric with spout 11. Washers 21 and keys 22 retain gears 18 at a suitable spacing from plate 13, determined by spacer bushing 23 and a friction washer 24. Ball bearings 25 facilitate easy rotary adjustment of ring gear 17. A circle common to studs 19 is of diameter to provide a close mesh between pinion gears 18 and ring gear 17 for accurate centering purposes.

Adjusting ring 16 is provided with slots 26 cut through ring 16 to form like spiral cams extending from positions near the base of the teeth to positions near the inner periphery. Studs or bolts 27 engage outer ends of vanes 30 at positions generally inward from studs 19, being equally spaced around adjusting ring 16 and passing through slots 26 to control the sliding position of the vanes as ring 16 is rotated. Suitable retaining means such as washers 28 and pins 29 maintain the adjusting ring in close contact with vanes 30, which are slidably secured to plate 13 by alignment bolts 35, 36 and carrying washers 37, 38.

Figure 1:
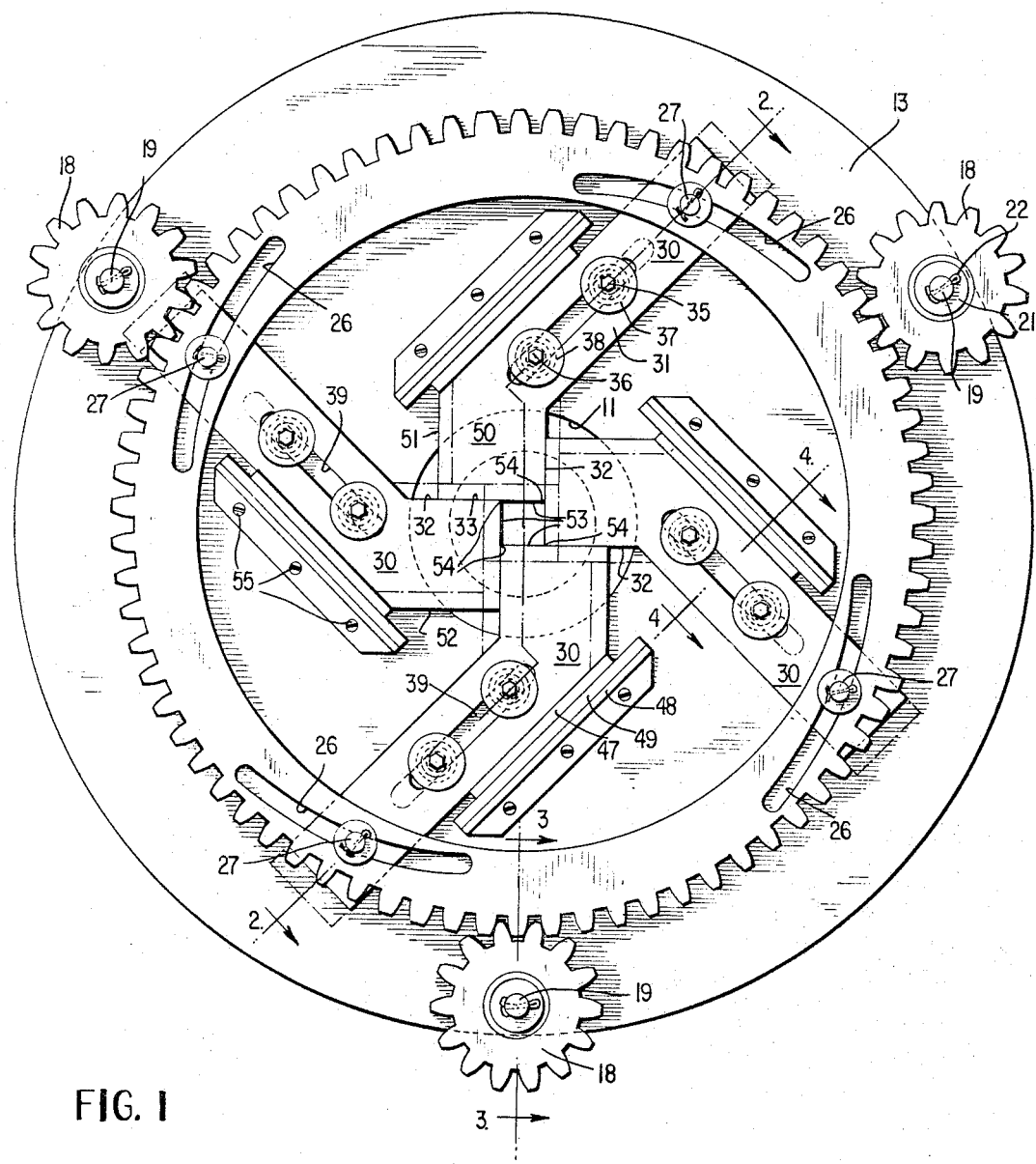
FIG. 1 is a plan view of a mechanism according to this invention showing a preferred embodiment of the iris mechanism and means for control of the orifice formed thereby.

The movable elements of the valve of this invention, as illustrated in FIG. 1, include four like elements generally shown at 30 as sliding vanes in the example illustrated, arranged 90° apart around a central aperture formed therebetween. Each vane consists of a flat strip of sheet material as at 31 having generally parallel edges and a major dimension extending parallel to base plate 13 from a position beneath and adjacent ring 16 to a position near the center of the base plate being disposed with edges generally at an angle to radial lines drawn from the center of the aperture in plate 13. Each strip 31 has a lateral offset face portion 32 generally at 45° disposition with respect to the major dimension of strip 31. A terminal inner end 33 is at an angle of 45° from the major dimension and at 90° disposition to the portion 32. (Opposite face 32 there may be a parallel face joining end 33 to the opposite edge of strip 31 from face portion 32, or the base 33 may join the back edge directly as in FIG. 5.)

Figure 5:
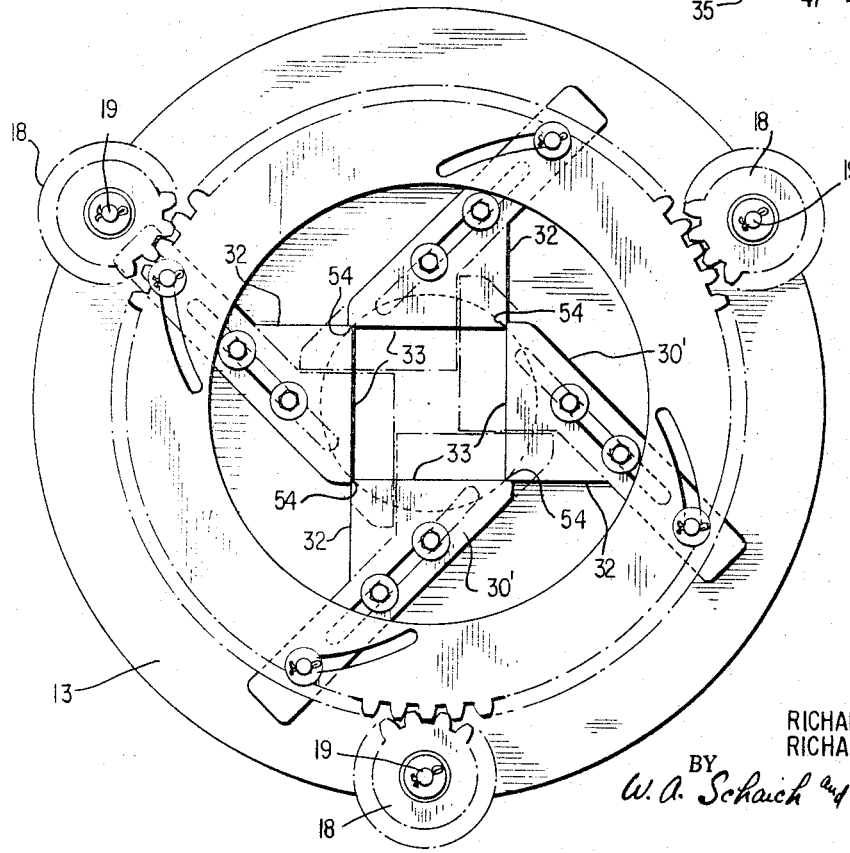
FIG. 5 is a plan view of a modified construction.

Each strip 31 has a central slot 39 parallel to the major dimension extending a considerable distance therealong to receive alignment studs 35 and 36 fitting therein and secured to plate 13. Bolts or studs 35 and 36 engage and restrain the strip 31 to motion parallel to plate 13 along the line joining studs 35 and 36. Outward therefrom are studs 27 each secured at the end of strip 31 to provide accurate linear movement thereof as each of studs 27 moves in a slot 26 upon rotation of ring 16. Slots 39 have parallel edges preferably spaced to receive snugly enlarged studs 41 and 42 which threadedly engage plate 13 and receive in the outer ends thereof the studs 35 and 36. Uniform tension between the vanes 30 and the plate 13 may be provided by springs 43 and 44 and washers 45 and 46 slidable on studs 41, 42 to bear against each vane. Spring tension then may be controlled by studs 35 and 36. In FIG. 5 studs 41, 42 and springs 43, 44 are omitted and studs 35, 36 engage plate 13. Each vane preferably has a back bearing strip 47 arranged parallel to the slot 39 slidably engaging a backing strip 48 having a bearing surface 49, which may be beveled to overhang the back edge 47 and adjusted by screws 55 engaging plate 13, or arranged perpendicular to the base plate 13 as illustrated. When vanes are of precisely formed metal the backing bearing may be omitted as in FIG. 5.

In FIG. 1 each vane has an end 50 offset relative to the linear portion and comprises parallel sides 32 and 52 being perpendicular to face 33. End 50 has a width at least equaling the maximum opening of the orifice formed between end faces 33. Portions of faces 33 not immediately contacting adjacent faces 32 are shown at 53 to define the open portion of the diaphragm. Edge 52 is illustrated as disposed at 45° from the direction of motion of vane 30.

Alternatively, the back edge of the linear portion of vane 30 may be extended to meet face 33 provided face 32 is given appropriate length and as illustrated in FIG. 5 the end portion 50 and edge 52 are substantially eliminated.

In the outermost position of adjustment of vane 30 by counterclockwise rotation of ring 16 only a small overlap of each face 32 with the adjacent end face 33 of the next clockwise positioned vane will be evident as illustrated in broken lines of FIG. 1 and solid lines of FIG. 5. As each vane is advanced along the line joining studs 41 and 42, the junctions between end faces 33 and back faces 32 form sliding joints terminated at vane points 54 to separate contacted portions of faces 33 from non-contacted portions 53 thus to define the variable orifice. Extension of the line joining studs 41 and 42 forms the hypotenuse of a right isosceles triangle of which the altitude equals the perpendicular distance from said line to the center of plate 13 and spout 11, thus to provide motion of point 54 along a radius from said center.

Since face 33 is perpendicular to face 32 in each case and the vanes move only along perpendicular lines at 45° angles thereto it will be evident that tight closure is maintained at all times between adjacent offset ends 50 of the four vanes 30 and of the triangular terminations as shown in FIG. 5, vanes there being designated 30'. Adjustment by merely sliding the vanes along four perpendicularly disposed lines thus provides adjustment of the orifice between exposed faces 53 in any amount from the length of faces 33 to a very small opening, as desired. The vanes are arranged in oppositely disposed pairs in which the lines of motion are parallel but displaced from each other a distance double the distance from the line joining studs 41, 42 to the center of the spout and corresponding points 54 of opposite vanes would meet if the vanes were advanced sufficiently to close the orifice completely.

Figure 4:
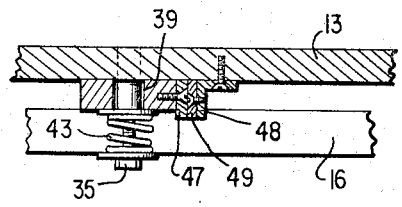
FIG. 4 is a sectional view taken along the line 4—4 of FIG. 1.

Apparatus as heretofore described may be adapted for use as a variable orifice for a glass furnace gob feeder by the employment of suitable materials especially for the vanes which contact the hot glass. It is important to maintain purity of the glass and freedom from contamination by metallic oxides, and for this purpose ceramic is a desirable material, but must have a substantial thickness so that a conventional overlapping iris diaphragm is not feasible. This invention provides a coplanar array of vanes which remains tight even though made of ceramic of considerable thickness. Ceramic materials are not formed as precisely as metals and precision is provided as shown in FIG. 4, a bearing being formed between the back edge 47 of the vane and backing strip 48, having thereon a surface element 49, these being preferably of a metal which does not oxidize appreciably at the temperatures encountered, even though they are not in contact with the glass. Motor 56 is suitably controlled by automatic circuitry 57, or by manual means, and drives one of pinion gears 18 by suitable shaft or indirect connection. Hand operated drive means for ring 16 may be employed and still achieve the advantage of this invention in that remote control by linkage permits fine adjustment of orifice from a distance. Circuit 57 may include an automatic process control feature variable over wide ranges without down time for adjustment of rate of glass withdrawal.

Vanes 30 shown as ceramic in FIG. 1 may likewise be made of metal as in FIG. 5 when high temperatures are not involved and the adjustable feature made precise within the desired degree of accuracy. In either case it will be noted that the vanes 30 are alike especially in thickness and all lie along the same plane adjacent to the plate 13 so that the faces opposite therefrom likewise lie in a common plane which may bear against the delivery spout when plate 13 is inverted but forms a lower face as illustrated in FIG. 2 wherein the lower surface of plate 13 and the upper faces of vanes 30 are coplanar with the end of the spout 11.

When apparatus of the character described is employed for delivery of heavy material or the apparatus is constructed in large sizes, it will be understood that a considerable weight of material will be bearing against the vanes so that the plate position inverted from that shown in FIG. 2 may be desirable to better support the ends of the vanes. An example would be in the delivery of grain to a mill or storage bin, and the like. When a large orifice is needed, the face portions 33 of vanes 30 are broadened to always slightly exceed the maximum dimensions of orifice desired and face portions 32 to at least the maximum variation in the opening.

A feature of the present invention derives from the fact that surfaces 32 and 33 are in sliding engagement at all times to prevent sifting therebetween of a finely powdered material or the flowing therebetween of a liquid. It will be understood that sliding joints of this type are not normally watertight but are sufficiently accurate in their sliding engagement to prevent viscous materials not tending to wet the surfaces from entering the crevices between the adjacent surfaces. Furthermore, materials having a tendency to stick or to gum, and thereby to clog the operation of the sliding surfaces, may be fed through an orifice of this character for the reason that adjustment of the position of the vanes causes vigorous wiping of the junction to effect a self-cleaning action as each surface 32 slides along the surface 33 of the next vane thereto.

The degree of adjustability is controlled by the difference in radial distance from the center of the opposite ends of the cam surfaces which define slots 26, and the type of spiral employed is variable to provide coarse or fine adjustment as the ring 16 is rotated. Outer cam surfaces normally engage pins 19 since pressure within the orifice tends to bear against faces 53 to urge vanes 30 against back bearing strips 48 or studs 41 and 42, and also to urge the vanes outwardly to force pins 19 against the outer cam surfaces of slots 26. Precision of control is improved by the providing of correspondingly shaped inner cam surfaces forming the inner edges of the slots to assure opening of the iris valve in proportion to the rotation of ring 16.

While other forms of vanes forming the periphery of the orifice might be employed and a number of vanes other than four, the design to achieve appropriate tight-fitting sliding contact of one vane against the next during adjustment is more involved and the four element embodiment is illustrative of the invention. Orifice shape is determined by the number of vanes, but may be made octagonal, if desired, by adding a 45° extension on face 53 at point 54. A separate mounting or supporting plate 13 is not required when the orifice is an opening in a flat bottomed hopper since the vanes may then be mounted directly on the planar surface of the hopper, which surface then corresponds to plate 13.

While the invention has been described with reference to an exemplary embodiment, it will be understood that other equivalent structures are intended to be included within the spirit and scope of the appended claims.

What is claimed is:
1. In an iris mechanism for control of flow of material from a container including a supporting plate and an outlet member terminating at a transverse plane parallel to said plate,
   a group of four iris vanes arranged equidistantly about said member with one surface thereof in contact with said member along said plane to restrict material flow to an orifice between said vanes,
   each said vane having a vertical face in contact with a vertical face of an adjacent said vane,
   headed pin means mounting said vanes on said supporting plate for linear sliding motion along like chords of a circle substantially concentric with said member along said plane,
   backing means maintaining contact between a forward face of each vane and a back face of each next vane during relative motion therebetween wherein said faces of each vane extend inwardly to meet at a right angle intersection on a radius of said circle which is parallel to said chord, and
   means adjusting said vanes simultaneously in like motions along said chords.

2. In the mechanism of claim 1 last said means including a driven ring spirally cammed and engaging cam follower means on each vane at 90° spacings therearound.

3. In a mechanism for glass drawing according to claim 1 said vanes comprising formed ceramic material having linear slotted openings engaging said mounting means.

4. In a mechanism according to claim 1 said mounting and maintaining means including guide means on each said vane in sliding juxtaposition to second guide means secured to said supporting plate parallel to said chord thereby to precisely control vane motion during adjustment of the iris mechanism.

5. In an iris mechanism for control of flow of material from an opening in a container,
   four slidable closure vanes supported perpendicularly about said opening having cooperating terminations including a pair of perpendicular faces at 45° angles to the direction of slidable motion, a forward face of each being exposed to define therebetween a variable iris opening,
   means for moving said vanes along perpendicular lines from open to closed positions to vary the iris opening, the intersection of said faces defining a point movable along a radial line from the center line of said opening,
   resilient means for maintaining said vanes in contact with said container adjacent said opening during movement from said open to said closed positions to confine flow of said material to said opening between said vane ends, and
   means for equalizing the degrees of motion of said vanes between said positions and retaining a back face of each vane in contact with a forward face of an adjacent vane during said motion.

6. In the mechanism of claim 5 said means for maintaining said vanes comprising a pair of post members aligned with the direction of motion thereof, and
   resilient flange means thereon retaining said vanes on said post members in contact with said plate.

7. In a mechanism according to claim 5 including a linear backing strip parallel to the direction of said motion said vane having a bearing strip along one side thereof engaging said backing strip to confine said motion to linear motion therealong.

References Cited
UNITED STATES PATENTS

| | | | |
|---|---|---|---|
| 497,903 | 5/1893 | Woodward | 251—212 X |
| 686,365 | 11/1901 | Thackray | 72—468 |
| 2,595,671 | 5/1952 | Greene | 251—368 |
| 3,037,473 | 6/1962 | Whistler et al. | 72—468 |

FOREIGN PATENTS 579,471  8/1946  Great Britain.

M. CARY NELSON, *Primary Examiner.*

R. C. MILLER, *Assistant Examiner.*